United States Patent [19]

Matano et al.

[11] Patent Number: 5,246,785
[45] Date of Patent: Sep. 21, 1993

[54] DECORATIVE SHEETS AND PROCESSES FOR PRODUCING THEM

[75] Inventors: Takashi Matano; Makoto Otabe, both of Tokyo, Japan

[73] Assignee: Dai Nippon Insatsu Kabushiki Kaisha, Japan

[21] Appl. No.: 665,083

[22] Filed: Mar. 6, 1991

[30] Foreign Application Priority Data

Mar. 9, 1990 [JP] Japan .................................. 2-56414

[51] Int. Cl.$^5$ .............................................. B32B 3/30
[52] U.S. Cl. ..................................... 428/542.2; 42/76; 42/156; 42/195; 42/409; 42/913.3
[58] Field of Search ............ 428/542.2, 904.4, 913.3, 428/76, 409, 195, 158-160, 156; 427/288, 256, 38, 395

[56] References Cited

U.S. PATENT DOCUMENTS

| | | | |
|---|---|---|---|
| 3,928,710 | 12/1975 | Arnold et al. | 428/483 |
| 4,187,131 | 2/1980 | Shortway et al. | 428/159 |
| 4,303,695 | 12/1981 | McCann et al. | 427/44 |
| 4,491,616 | 1/1985 | Schmidle et al. | 428/158 |

FOREIGN PATENT DOCUMENTS

| | | | |
|---|---|---|---|
| 2090778 | 1/1972 | France. | |
| 0199249 | 11/1984 | Japan | 428/195 |
| 2057362 | 4/1981 | United Kingdom. | |

OTHER PUBLICATIONS

Patent Abstracts of Japan, vol. 12, No. 145 (m-693 [2992], May 6, 1988; & JP-A-62 267 193 (Dainipponn Printing Co., Ltd).

Patent Abstracts of Japan, vol. 14, No. 305 (M-992) [42481], Jun. 29, 1990; & JP-A-2 98 441 (Toyo Linoleum Co., Ltd).

Patent Abstracts of Japan, vol. 14, No 235 (M-975) [4178], May 18, 1990; & JP-A-2 62 289 (Toppan Printing Co., Ltd).

*Primary Examiner*—Patrick J. Ryan
*Assistant Examiner*—W. Krynski
*Attorney, Agent, or Firm*—Parkhurst, Wendel & Rossi

[57] ABSTRACT

A decorative sheet including a printing base material, and an embossed print pattern formed on the printing base material in combination with an ordinary print pattern or alone, the embossed print pattern being formed with an ink composition comprising a poly(vinyl chloride) resin and a reactive acrylic resin as the main components.

3 Claims, 1 Drawing Sheet

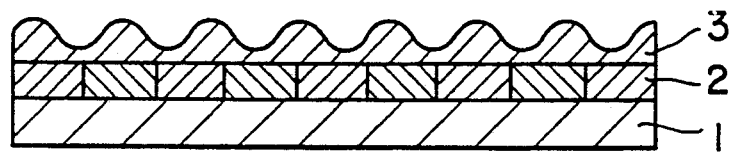
F I G. 1
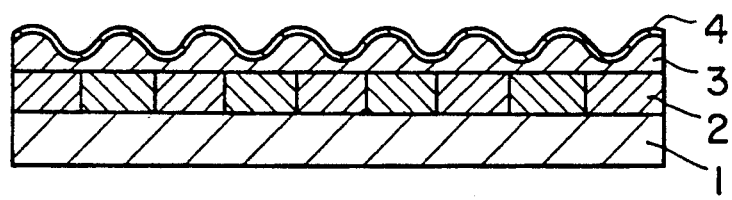
F I G. 2
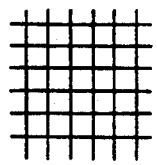   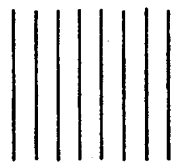   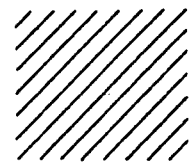
F I G. 3A    F I G. 3B    F I G. 3C
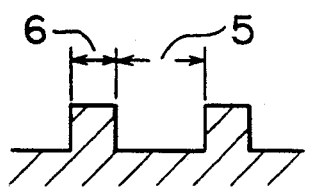
F I G. 4

DECORATIVE SHEETS AND PROCESSES FOR PRODUCING THEM

BACKGROUND OF THE INVENTION

The present invention relates to decorative sheets which are used for the surfaces of furnitures or architectural mounting materials such as wall materials, ceiling materials, counter top materials or the like, and processes for producing them.

As conventional surface decorative sheets, there are mentioned, for example, (1) a pre-coated paper in which an ordinary printing is provided on a paper base paper and an aminoalkyd resin or an urethane resin is then coated, (2) a decorative sheet in which in combination with an ordinary printing, an ink comprising a poly(vinyl chloride) resin and containing or not containing a foaming agent is embossed in the form of a pattern on a paper base paper, or (3) a decorative sheet in which a poly(vinyl chloride) sheet having been sheeted by a calendering method or an extruding method is put into print and then subjected to a heat embossing process.

Among the sheets according to the aforementioned techniques, as for (1), it is difficult to afford an unevenness, i.e., convex-concavity feeling by an ordinary printing and thus it is possible only to express a print of inferior quality as a design. Moreover, since the surface resin layer is very rigid, hard and fragile, it is not desirable to coat it in a large amount. Generally, a paint having a high solid content cannot be designed, and thus it is difficult even to reach the coating in a large amount. Therefore, the sheet according to (1) has a problem that it is difficult to obtain a decorative sheet having excellent wear resistance.

As for (2), it is possible to afford a convex-concavity feeling and to express a print of superior quality as a design. However, since such a sheet comprises a poly(vinyl chloride) resin, it has also a problem that it is difficult to obtain a decorative sheet excellent in wear resistance.

As for (3), a poly(vinyl chloride) sheet is excellent in thermal processability, so that it is possible to afford a convex-concavity feeling and to express a print of superior quality as a design by subjecting the sheet to a heat embossing process. However, such a sheet has problems that it has an insufficient heat resistance and lacks in wear resistance in spite of its softness as a decorative sheet.

SUMMARY OF THE INVENTION

In order to solve the aforementioned problems, the present invention aims at a decorative sheet characterized in that on a base material for printing, a printing ink comprising a polyvinyl chloride resin and a reactive acrylic resin as main components is embossed in the form of a pattern in combination with an ordinary printing or alone, a process for producing a decorative sheet characterized in that the reaction of the reactive acrylic resin is completed with a peroxide and heat or by the irradiation of an ionizing radiation.

BRIEF DESCRIPTION OF THE DRAWINGS

FIG. 1 is a sectional view of a decorative sheet as an example of the present invention;

FIG. 2 is a sectional view of a decorative sheet as another example of the present invention;

FIGS. 3(A), (B) and (C) are plan views which show the kinds of printing patterns; and FIG. 4 is a sectional view of a printing pattern.

DETAILED DESCRIPTION OF THE INVENTION

Base Materials for Printing

It is possible to use any sheet materials used for printing, for example a tissue paper having a basis weight of 23–65 g/m$^2$ or a reinforced paper having a resin incorporated, a base paper for building materials such as a resin impregnated paper having a basis weight of 50–150 g/m$^2$ or other paper base materials, a synthetic paper as well as a poly(vinyl chloride) sheet, a polyethylene terephthalate sheet or other plastic sheet.

Printing Methods

Any ordinary printing methods such as gravure printing, offset printing or letterpress printing may be used, and the gravure printing is preferably used. This is suitable for emboss printing described later.

Poly(Vinyl Chloride) Resin

It is possible to use a poly(vinyl chloride) resin having a polymerization degree of 500–1,300 and a modified poly(vinyl chloride) which has been copolymerized with vinyl acetate, a maleic acid ester or the like in order to modify its film-forming properties, heat resistance or the like. It is also preferable to use a plasticizer to give plasticization. As the plasticizer, there can be used, for example, diethyl phthalate, dibutyl phthalate, butyl lauryl phthalate, di-n-octyl phthalate, butyl benzyl phthalate, butyl phthalylbutyl glycolate, di-2-ethylhexyl phthalate, di-2-ethylhexyl adipate, di-2-ethylhexyl azelate, di-octyl sebacate, trioctyl phosphate, methyl acetyl ricinoleate, diethylene glycol dipelargonate, a pentaerythritol derivative, an aromatic hydrocarbon condensate, an alkylated polyaromatic hydrocarbon oil, a polyester, a monoester, pentachloromethyl stearate or a liquefied chloroparaffin alone or in admixture thereof. It is preferred to use a stabilizer, and there may be used a liquid non-tin type stabilizer, for example a Cd (cadmium) type, a Ba (barium) type, a Zn (zinc) type, a Cd-Ba type, a Cd-Ba-Zn type or a Ba-Zn type, or an organotin type stabilizer such as a laurate type, a maleate type, an alkylmaleate type, an ether ester type, a laurate maleate complex or a mercaptide. There can be used additives such as silica, talc or clay, and coloring agents such as various inorganic or organic pigments.

Reactive Acrylic Resin

As a polymerizable monomer, there can be used monofunctional monomers such as 2-ethyl hexyl acrylate, 2-hydroxyethyl acrylate, 2-hydroxypropyl acrylate or 2-hydroxyethylacryloyl phosphate; bifunctional monomers such as 1,3-butanediol diacrylate, 1,4-butanediol diacrylate, 1,6-hexanediol diacrylate, diethylene glycol diacrylate, tripropylene glycol diacrylate, neopentyl glycol diacrylate, polyethylene glycol 400 diacrylate or hydroxypivalate neopentyl glycol diacrylate; trifunctional monomers trimethylolpropane triacrylate, pentaerythritol triacrylate or dipentaerythritol hexaacrylate.

As a polymerizable oligomer, there can be used a polyester acrylate, a polyurethane acrylate, an epoxy acrylate, a polyether acrylate, an oligoacrylate, an alkyd acrylate, a polyol acrylate, a melamine acrylate, a silicon acrylate, or the like.

The reactive acrylic resins indicate resins comprising a polymerizable monomer or a polymerizable oligomer as a main component, and these resins may be used alone or in admixture of these several resins. Moreover, the aforementioned polymerizable monomer or oligomer means an acrylic acid ester having an acryloyl group as a functional group, and a methacrylic acid ester can also be used in place of the acrylic acid ester.

Reaction of the Reactive Acrylic Resin

In this connection, when a method of irradiating an ionizing radiation such as a method of irradiating ultraviolet rays as the method for reacting the reactive acrylic resins, a photopolymerization initiator and/or if necessary a photosensitizer can be added. As the photopolymerization initiator, there may be mentioned any initiators which generate radicals by ultraviolet rays such as biacetyl, acetophenone, benzophenone, Michler's ketone, benzyl, benzoin, benzoin isobutyl ether, benzyl dimethyl ketal, tetramethylthiuram sulfide, azobisisobutyronitrile, benzoyl peroxide, 1-hydroxycyclohexyl phenyl ketone, α-hydroxyisobutyl phenone, p-isopropyl-α-hydroxyisobutyl phenone and the like. As the sensitizer for assisting the generation of radicals, there are used triethylamine, diethylaminoethyl methacrylate or the like.

On the other hand, an initiator is used also in the case of using heat for reacting the reactive acrylic resin. As the initiator, there can be also used azobisisobutyronitrile or the like in addition to peroxides such as benzoyl peroxide or methyl ethyl ketone peroxide. The initiator may be any one which generates radicals upon heating.

Emboss Printing Using Ink Composotion Comprising a Polyvinyl Chloride Resin and a Reactive Acrylic Resin as the Main Component A printing ink comprising both components has appropriately a viscosity in the range of several hundred to several thousand cps. The viscosity can be adjusted with an ordinary organic solvent, which is preferably a cellosolve type on the basis of promoting the gelation of the ink.

As the method for the emboss printing, there may be used any printing methods which can relieve a print in the form of a pattern, and the gravure printing method is preferred as a printing method which can be stably conducted in a web state and from which a relief effect can be anticipated. A gravure cylinder having a print depth in the range of 45 μm-200 μm is used for the method. A screen may or may not be provided (see FIG. 3). Generally speaking, a relatively fine pattern which has little unevenness gives a more stabilized transferred state by providing an ordinary screen having 50 lines per inch [see FIG. 3(A)], a multi-lined screen in the form of stripe [see FIG. 3(B)] or an oblique multi-lined screen in the form of oblique stripe [see FIG. 3(C)]. In this case, the ratio of the cell width (see 5 in FIG. 4) and the bank width (see 6 in FIG. 4) depend on the viscosity of an ink used and a rate of transfer, preferably in the range of 3 or more.

The thickness of the unevenness of the ink transferred is planned according to a design, and a design having a more three-dimensional appearance can be obtained by increasing the thickness. If only the impression of gloss rather than the impression of unevenness is expected, the unevenness of the ink may be in the thickness of several microns. However, it has preferably a thickness of 10 microns or more in order to obtain wear resistance.

While a print pattern having an unevenness may be used independently but not in combination with an ordinary print, it is preferably used in combination with an ordinary plain print in order to obtain a design of high quality. In this case, the printing pattern having an unevenness plays a role of a part of the design. That is, it forms a part of a pattern in or not in harmony with an ordinarily printed pattern. If the printing pattern having an unevenness is used in combination with an ordinary print, it may be provided before, after or during the ordinary printing procedure. Such a condition should be determined according to designs to be obtained.

In this connection, as the method for curing the printing ink, there may be used the irradiation of electron rays in addition to the methods by the heat or the irradiation of ultraviolet rays as described in the paragraph of the reaction of reactive acrylic resins.

Protecting Layers Having a Transparency

In the present invention, a surface protecting layer having a transparency may be provided, if necessary, in order to protect a print layer or to adjust the gloss. As the protecting layer, there can be used any resins such as an acrylic, a polyester, an urethane or an alkyd resin, preferably a setting type in consideration of improving the physical properties such as heat resistance or solvent resistance, particularly an urethane type in consideration of the heat resistance, hardness and adhesion to a printing ink embossed in the form of a pattern.

As the coating method, there can be used general methods such as gravure coating, roll coating, air-knife coating, Mayer's bar coating, doctor blade coating or dip coating.

The decorative sheet according to the present invention is printed with a printing ink which comprises a poly(vinyl chloride) resin and a reactive acrylic resin as the main components and is embossed in the form of a pattern. Thus, the poly(vinyl chloride) resin maintains the physical unevenness of the embossment until it is dried or cured after printing and acts as a component for assisting the expression of a design of high quality. The reactive acrylic resin affords hardness to the ink and acts for giving excellent surface properties such as wear resistance, solvent resistance and the like.

According to the present invention, a design of high quality having a three-dimensional appearance or a cubic effect can be expressed and a decorative sheet excellent in wear resistance, solvent resistance or the like can be produced easily and efficiently by providing a printing ink comprising as two main components a poly(vinyl chloride) resin having a shape-maintaining effect and a reactive acrylic resin which develops surface properties in the form of a pattern.

In the present invention, the aforementioned emboss printing is preferably carried out under the following conditions:

a) as the poly(vinyl chloride) resin, a poly(vinyl chloride) having an average polymerization degree of 800 is used, b) as the reactive acrylic resin, trifunctional trimethylolpropane trimethacrylate is used, c) curing reaction is conducted by crosslinking with heat, in which benzoyl peroxide is used as a reaction initiator,
d) the viscosity of the embossed ink is adjusted to 1,000-3,000 cps on printing,
e) the printing of the embossed ink is conducted on a gravure printing plate,
f) as the gravure printing plate, the following plate is used:
   depth of the plate: 45-200 μm,
   cell aperture width/wall width ≧3,
g) the ratio of the depth to the width, that is cell width/depth is provided in the range of 2-5,
h) in printing, a screen having stripes oblique to the direction of printing is used, and
i) the original drawing of a pattern to be printed comprises a pattern containing the pattern edge, and printing is conducted by arranging the pattern edge oblique to the printing direction.

In the present invention, the poly(vinyl chloride) resin and the reactive acrylic resin are used in combination thereof at the emboss printing, so that (i) the transfer property of the embossed ink during printing, that is the sharpness of the edge of the printed part and the transfer rate can be improved, (ii) the shape-maintaining property, that is the embossed shape immediately after the transfer of the ink from a printing plate to a body to be printed being maintained until curing step of the ink is improved, thereby to impart an excellent three-dimensional appearance to the printed pattern, and further (iii) the wear resistance, chemical resistance and resistance to staining of the embossed printed part after curing can be improved.

EXAMPLE 1

The surface of a tissue paper 1 having a basis weight of 30 g/m² (manufactured by SANKO SEISHI K.K., weight Japan) (FIG. 1) was printed with an ink A of a vinyl chloride having the following composition by a gravure rotary press to give solid prints on all the surface on the first and second color printings, and the amount coated of the India ink 2 (FIG. 1) in 10 g/m² dry was determined.

| Ink A: | |
|---|---|
| pigment: | carbon black and the like, |
| resin: | vinyl chloride-vinyl acetate copolymer, |
| additive: | dioctyl phthalate, |
| solid content: | 28%, |
| pigment/vehicle: | 0.27, |
| solvent: | toluene, methyl isobutyl ketone, cyclohexanone, ethyl acetate. |

On printing the subsequent third ink, an ink B having the following composition was printed under the following various conditions to emboss the ink in the form of a texture. The amount of the ink 3 coated (FIG. 1) was 20 g/m² dry.

| Ink B: | | |
|---|---|---|
| resin: | polyvinyl chloride/trimethylolpropane trimethacrylate = 2/1 | 100 parts by weight |
| additive: | silicone dioxide | 2 parts by weight |
| | dibutyl phthalate | 4.5 parts by weight |
| initiator: | benzoyl peroxide | 3 parts by weight |

| -continued | | |
|---|---|---|
| Ink B: | | |
| Drying: | 150° C., 3 seconds, | |
| Viscosity: | 2000 cps (20° C.), | |
| Plate: | gravure cylinder | |
| screen lines: | | 50 lines/inch, |
| plate depth: | | 60 μm, |
| cell width/bank width: | | 50. |

Heat drying was conducted at 200° C. for 30 seconds to cure completely the aforementioned ink B. In this case, the reaction is completed by heat and benzoyl peroxide.

When the sheet was mounted on plywood having a thickness of 2.7 mm with a vinyl acetate adhesive (manufactured by CHUO RIKA K.K., Japan, "AC500"), a decorative sheet having wear resistance and cubic effect was obtained.

EXAMPLE 2

Three color printing operations were conducted in the same manner as Example 1 with a gravure rotary press to give a similar sheet (see FIG. 2; 1, 2 and 3).

Next, a transparent resin layer 4 (FIG. 2) having the following formulation was provided on a printed paper and dried with a gravure roll coater having two coater heads in which heating was conducted at 200° C. for 30 seconds by the first unit and a gravure roll having a plate depth of 150 μm was used in the second unit:

| transparent resin layer: | |
|---|---|
| acrylic polyol | 100 parts by weight |
| hexamethylene diisocyanate | 15 parts by weight |
| ethyl acetate | 20 parts by weight |
| toluene | 10 parts by weight |

The thus obtained sheet was laminated on a particle board having a thickness of 15 mm with a urea adhesive (manufactured by MITSUI TOATSU CHEMICAL'S INC., Japan; "UROID") by a hot press to give a decorative sheet excellent in wear resistance and solvent resistance and having a cubic effect.

EXAMPLE 3

Solid printing was first conducted on the whole surface of a reinforced paper (manufactured by SANKO SEISHI K.K., Japan) having a basis weight of 20 g/m² with an ink C having the following formulation by a gravure rotary press:

| pigment: | titanium dioxide and the like, |
|---|---|
| resin: | pyroxylin, |
| | butyral resin, |
| | acrylic resin, |
| solid content: | 38%, |
| pigment/vehicle: | 3.0, |
| solvent: | methanol, ethyl acetate. |

Second and third printings were conducted with the in Example 1 to print a grain pattern.

A fourth printing was conducted with the ink B used in Example 1 to emboss it to height of 30 μm in the form of a texture not in harmony with the grain pattern. Printing conditions were the same as in Example 1.

Next, in a gravure roll coater having two coater heads in the same manner as in Example 2, the ink B was cured completely in the first unit, and a transparent resin layer was provided on a printed paper and dried in the second unit.

The thus obtained grain pattern sheet was laminated on a MDF (medium density fiber) board having a thickness of 20 mm with a urea adhesive (manufactured by MITSUI TOATSU CHEMICAL'S INC., Japan; "UROID") by a hot press to give a grain decorative sheet of high quality which was excellent in wear resistance and solvent resistance and could be also applied to the horizontal plane of furniture.

EXAMPLE 4

First and second solid printings were conducted on the whole surface of a tissue paper (manufactured by SANKO SEISHI K.K., Japan) having a basis weight of 30 g/m² with an ink A by a gravure rotary press in the same manner as in Example 1 to give a coated amount of an India ink of 10 g/m² dry.

Third printing was conducted with an ink D having the following formulation to emboss it to a height of 30 μm in the form of a texture. In this case, the coated amount of the ink was 20 g/m² dry.

| Ink D: | | |
|---|---|---|
| resin: | polyvinyl chloride/tri-methylolpropane triacrylate = 3:1 | 100 parts by weight |
| additive: | silicone dioxide | 2 parts by weight |
| | dioctyl phthalate | 5 parts by weight |
| stabilizer: | Ba-Zn type | 3 parts by weight |
| photoinitiator: | biacetyl | |
| drying: | 150° C., 3 seconds, | |
| Viscosity: | 3000 cps (20° C.), | |
| plate: | gravure cylinder | |
| screen lines: | | 50 lines/inch, |
| plate depth: | | 60 μm, |
| cell width/bank width: | | 50. |

Next, a transparent resin layer having the following formulation was provided in an amount of 10 g/m² on a printed paper with a gravure roll having a plate depth of 80 μm in a gravure roll coater which is capable of irradiating EB:

| transparent resin layer: | |
|---|---|
| trimethylolpropane triacrylate | 40 parts by weight |
| polyester acrylate (DAINICHI SEIKA KOGYO K.K., Japan, EBC) | 60 parts by weight |

The following condition was provided as the irradiating condition of EB. In this case, the reaction is completed by the irradiation of ultraviolet rays.

| Oxygen concentration: | 100 ppm, |
|---|---|
| Voltage: | 175 KV, |
| Irradiated dosage | 5 Mrad. |

The decorative sheet obtained was laminated on a particle board having a thickness of 15 mm with a urea type adhesive (manufactured by MITSUI TOATSU CHEMICAL'S INC., Japan; "UROID") by a hot press. The decorative sheet obtained was excellent in wear resistance and solvent resistance, had a cubic effect and also could be applied to the horizontal plane.

What is claimed is:

1. A decorative sheet comprising:
a printing base material; and
an embossed print pattern formed on the printing base material, said embossed print pattern being formed by curing, according to a crosslinking reaction by heat, an ink composition comprising a poly(vinyl chloride) resin having an average polymerization degree of 800, a trifunctional trimethylolpropane trimethacrylate, and benzoyl peroxide as a reaction initiator.

2. The decorative sheet according to claim 1, further comprising a transparent protecting layer formed on said embossed print pattern.

3. The decorative sheet according to claim 1, wherein said embossed print pattern is formed on said printing base material in combination with an ordinary print pattern.

* * * * *